United States Patent [19]

Boyle

[11] Patent Number: 4,759,311
[45] Date of Patent: Jul. 26, 1988

[54] CHILD SAFETY RESTRAINING DEVICE

[76] Inventor: Michael A. Boyle, 5922 Amberdale Dr., Yorba Linda, Calif. 92686

[21] Appl. No.: 877,476

[22] Filed: Jun. 23, 1986

[51] Int. Cl.⁴ .............................................. A01K 27/00
[52] U.S. Cl. ..................................... 119/96; 119/124; 128/134
[58] Field of Search .................. 119/96, 27, 124, 106, 119/109; 128/134; 182/3

[56] References Cited

U.S. PATENT DOCUMENTS

| | | | |
|---|---|---|---|
| 579,818 | 3/1897 | Cooley | 119/96 |
| 3,104,650 | 9/1963 | Grahling | 119/96 |
| 3,295,501 | 1/1967 | Riley | 119/96 |
| 3,301,594 | 1/1967 | Pukish, Jr. | 182/3 X |
| 3,324,851 | 6/1967 | Posner | 128/134 |
| 3,480,275 | 11/1969 | Jernstrom et al. | 128/134 X |
| 4,214,382 | 7/1980 | Matsutani | 119/96 X |
| 4,621,589 | 11/1986 | Thinnes | 119/96 |

FOREIGN PATENT DOCUMENTS 1013506  12/1965  United Kingdom .................. 119/96

Primary Examiner—David A. Scherbel
Assistant Examiner—Richard E. Chilcot, Jr.
Attorney, Agent, or Firm—Herb Boswell

[57] ABSTRACT

A child safety restraining device for use on airlines, trains, busses and other transportation, has a child waist strap which is secured around the waist of a child with a safety buckle. The child waist strap is secured to an adult waist strap utilizing a connecting member. The adult waist strap is secure around the waist of an adult also with a safety buckle. This secures the child to the adult. Additionally a crotch strap or shoulder straps can be attached to the child waist strap to secure the positioning of the child in the child waist strap. The safety buckles would comply to safety standards and both the child waist strap and the adult waist strap would be formed from appropriate webbing which also complies standards to insure that in a crisis situation the child will be safety secured to the adult. Further for use on commercial airlines, the adult would strap themselves to the airline seat using the existing airline seatbelt and the child would be secured to the adult using the child safety restainng device of the invention.

3 Claims, 2 Drawing Sheets

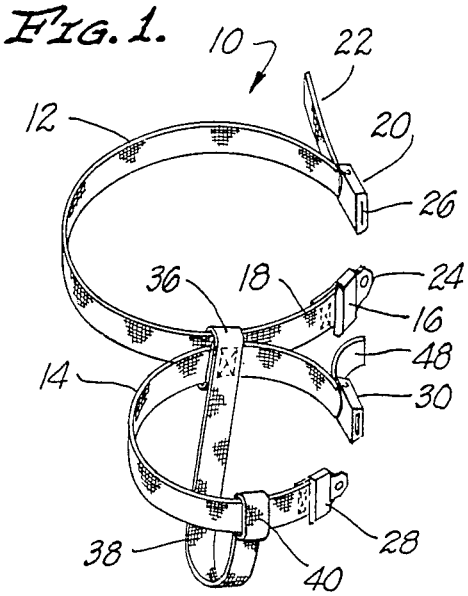
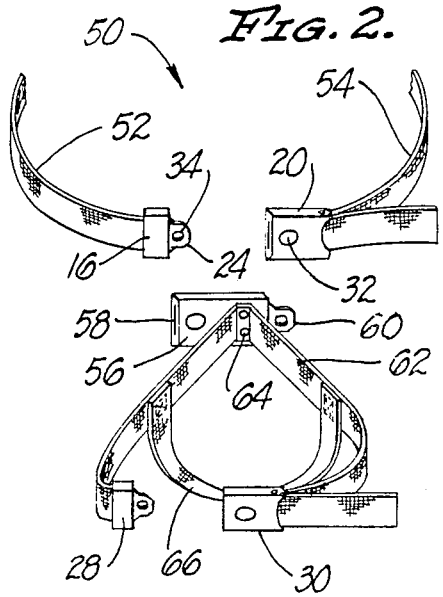
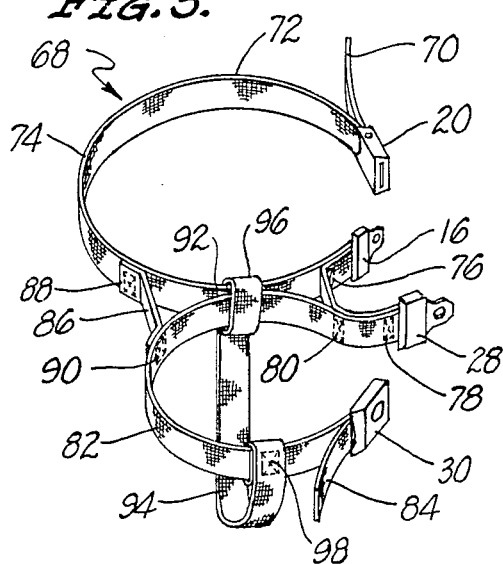
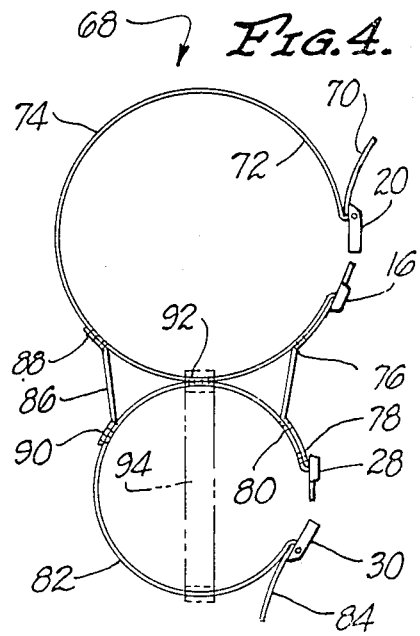

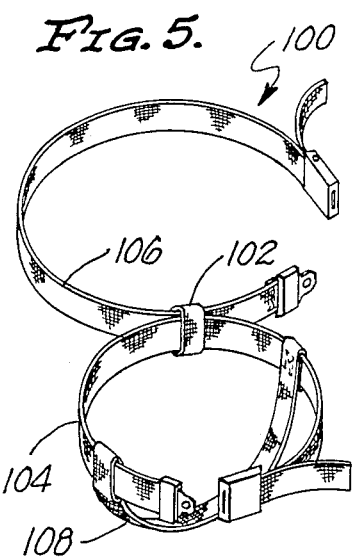
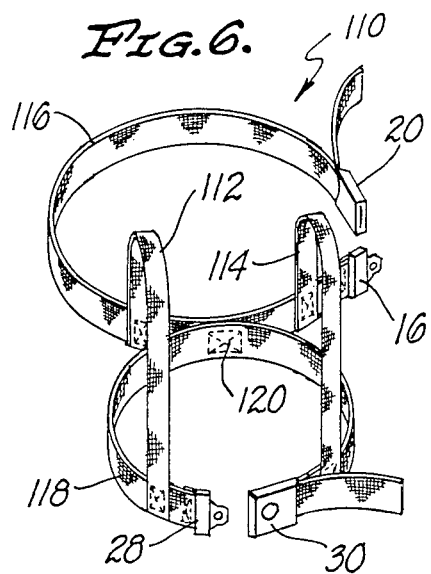
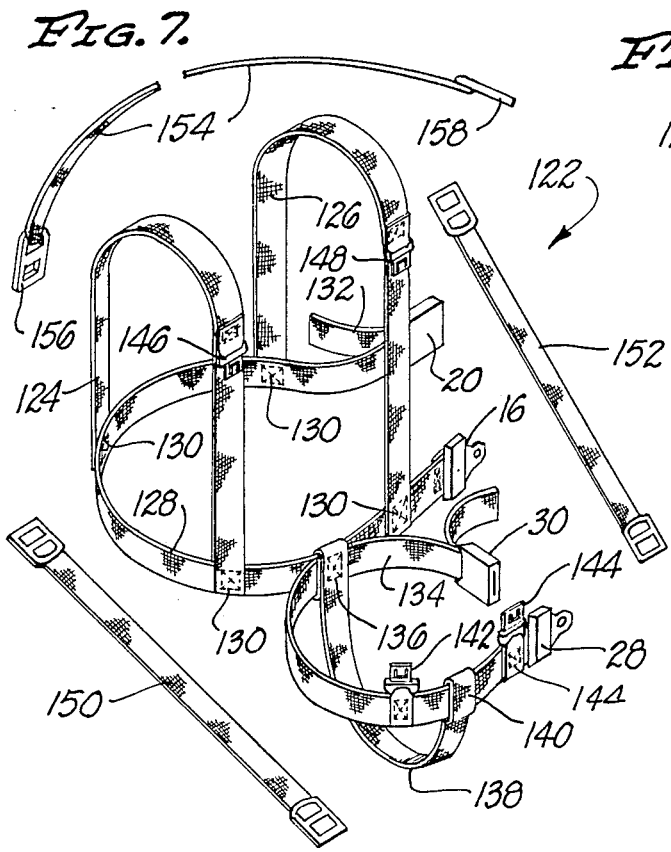
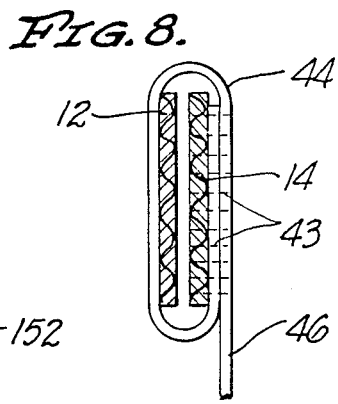
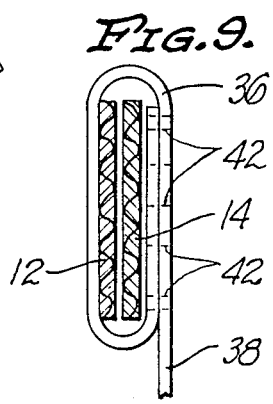

CHILD SAFETY RESTRAINING DEVICE

BACKGROUND OF INVENTION

This invention is directed to a safety restraining device for connecting a child to an adult.

On airlines the FAA requires that at least a lap seatbelt be provided for each passenger or occupant of the airline. At least on commercial flights, it is required before take-off and landing that each occupant of the airline be securely fastened into their seat except small children which are held by their parents. Airline rules allow a small child to accompany the parent and occupy the same seat of the parent as long as they are held on the lap of the parent.

While the safety rules make provision for each occupant of a seat to be safely and securely fastened in that seat at least during take-off and landing, they totally neglect the safety of a lap held child. The parent, in attempting to secure the child, might co-engage the child within the parent's own seatbelt. However, this is a false form of safety. If the child were also strapped into the seatbelt with the parent and for some reason the parent is suddenly thrust forward, the parent would squash and crush the child against the seatbelt. Because of this, it is far safer for the parent to simply hold the child. However, in a crisis situation—especially in a situation where the parent may become injured—the parent's grip on their child would be lost and the child would be propelled by inertia into any obstacle immediately to the front of the child.

It is evident that while airlines enforce the safety of each of the passengers which occupies the airline's seats, the safety of lap-held children and infants has been neglected.

On other forms of public transportation, such as busses and trains, absolutely no seatbelts are provided for any of the occupants whether they be an adult or a child. In case of an accident or crash of such public transportation, even in a very minor accident, the probability of the child flying off the parent's lap is very high.

Federal law mandates that all automobiles be equipped with seatbelts. Certain states mandate that the occupants of automobiles utilize those seatbelts. Even more progressive states mandate that small children be placed in carseats which are specifically adapted for the safety of the child; or, if the child is of a larger size, be securely positioned within a seatbelt. In those states where child-restraint is not mandatory, a parent, especially in someone else's automobile, may wish to hold the child other than position the child in a child-restraining chair. In these situations, as in public transportation and airlines noted above, there is nothing to prevent the child from flying off the parent's lap in case of a sudden stop, crash, or other crisis situation.

BRIEF DESCRIPTION OF THE INVENTION

In view of the above, it is obvious that there exists a need for new and improved child safety restraining devices, especially for use on public carriers such as airlines, busses, and trains. It is, therefore, a broad object of this invention to fulfill this need. Additionally, it is an object of this invention to provide a child safety restraining device which is lightweight and comfortable for both the parent and the child, thus encouraging the use of the device. Further, it is an object of this invention to provide a child safety restraining device which, because of the engineering principles inherent therein, is easy to manufacture and is economically available to the consuming public, as well as capable of a long and useful lifetime.

These and other objects, as will become evident from the remainder of this specification, are achieved in a child safety restraining device which comprises: a child body attaching means for fitting and securely attaching to a child with the child body attaching means being sized and shaped to encircle at least the trunk portion of the child. Further it includes an adult body attaching means for fitting and securely attaching to an adult with the adult body attaching means being sized and shaped to encircle at least the trunk portion of an adult. At least one of the child body attaching means and the adult body attaching means including a safety buckle for fastening a first portion of the one body attaching means to a further portion of the one body attaching means. It further includes a connecting means for connecting the child body attaching means to the adult body attaching means with the connecting means retaining the child body attaching means to the adult body attaching means whereby when the child body attaching means is located on a child and the adult body attaching means is located on an adult, the child will be maintained securely fastened to the adult when subjected to a substantial force tending to separate the child from the adult.

An embodiment of the invention further includes a child safety restraining device which comprises: an adult waist strap having a first buckle means located proximal to one end thereof and a second buckle means located on the other end thereof and a child waist strap having a first buckle means located proximal to one end thereof and a second buckle means located on the other end thereof and further a connecting means for connecting the child waist strap to the adult waist strap so as to maintain the child waist strap in operative connection with the adult waist strap.

BRIEF DESCRIPTION OF THE DRAWINGS

This invention will be better understood when taken in conjunction with the drawings wherein:

FIG. 1 is an isometric view of a first embodiment of a child's safety restraining device of the invention;

FIG. 2 is an isometric view of a further embodiment of a child's safety restraining device of the invention;

FIG. 3 is an isometric view of a further embodiment of a child's safety restraining device of the invention;

FIG. 4 is a diagramatic plan view showing the lacing of the straps in the child's safety restraining device of FIG. 3;

FIG. 5 is an isometric view of a further embodiment of a child's safety restraining device of the invention;

FIG. 6 is an isometric view of a further embodiment of a child's safety restraining device of the invention;

FIG. 7 is an isometric view of a further embodiment of a child's safety restraining device of the invention;

FIG. 8 is a side elevational view of a first construction for attaching the infant portion of the child's safety restraining device of the invention to the adult portion; and FIG. 9 is a further side elevational view in partial section of a further construction for attaching the infant portion of the child's safety restraining device to the adult portion.

This invention utilizes certain principles and/or concepts as are set forth in the claims appended hereto. Those skilled in the safety arts will realize that these principles and/or concepts are capable of being utilized in a variety of embodiments which may differ from the illustrated embodiments shown herein. For this reason this invention is not to be construed as being limited solely to the illustrative embodiments, but should only be construed in view of the claims.

DETAILED DESCRIPTION OF THE INVENTION

FIGS. 1, 2, 3, 5, 6, and 7 show various embodiments of a child's safety restraining device of the invention. In each of these there is a portion of the device for coupling to an child or infant and a further portion for coupling to an adult. Various different ways of attaching the infant portion to the adult portion are shown in combination with various straps, webbing, and the like. It will be evident to those skilled in the safety arts that, while for the purposes of illustration a particular attachment method is shown with a particular webbing design, that other attachment methods or webbing designs of the other embodiments could be interchangeable.

In FIG. 1 a first embodiment of a child safety restraining device is illustrated. In this embodiment, the device 10 includes a waist strap 12 for attaching around the midsection or trunk of an adult which is coupled to a waist strap 14 for attaching around the midsection or trunk of an infant or small child. A buckle 16 is attached to first end 18 of the adult waist strap 12. A complimentary buckle 20 is attached near the other end 22 of the strap 12. The two buckles, 16 and 20, can be any one of a number of commercially available types of safety buckles for use on seatbelts.

For the purposes of illustration herein, the buckle 16 is shown with a projecting tab 24 which fits into a slot 26 in the buckle 20 and locks therein. This allows coupling of the buckle 16 to the buckle 20 to fix the strap 12 around the waist of the adult. The buckle 20 is a typical adjusting type buckle which allows for positioning of the buckle 20 at different locations along the strap 12 adjacent to the end 22 of the strap 12. Thus, the strap 12 can be customized to the periphery of the adult around the waist portion of the adult.

Also for other purposes of illustration herein, the tab 24 is shown on the fixed buckle 16 and the slot 26 on the adjustable buckle 20. It is realized, of course, that the tab 24 could be on the adjustable buckle 20 with an appropriate slot 26 than on the fixed buckle 16.

Additionally for the purposes of illustration of this invention, the buckles 16 and 20 will be utilized with all of the various embodiments in describing the adult waist straps, and similar buckles 28 and 30 will be utilized for all of the child waist straps hereinafter described. Thus, in each of the various figures the numerals 16 and 20 will be utilized to describe the adult buckles, and the numerals 28 and 30 utilized to describe the infant or child buckles. The infant or child buckles will be constructed in a similar manner to the adult buckles 16 and 20 with the exception that in certain instances it might be deemed desirable to make them slightly smaller in size.

Referring briefly to FIG. 2, the adult buckle 20 shown thereon is shown in front view such that the unlocking button 32 in the center of the button can be seen. After the buckles 16 and 20 are coupled together by inserting the tab 24 into the slot 26, they can be released by pressing the unlocking button 32 on the buckle 20. Also evident in FIG. 2 is the location of an appropriate opening 34 in the tab 24 of the buckle 16 which is utilized in the types of buckles shown in the figures for locking of the tab 24 to the buckle 20. Other appropriate safety buckles may or may not utilize these exact combination of elements, however, for the purposes of illustration of this invention it is sufficient that both the waist strap of the adult and the waist strap of the child in each of the various embodiments shown in the figures be equipped with a releasable safety buckle.

Referring again to FIG. 1, the child waist strap 14 is attached to the adult waist strap 12 utilizing a first loop 36 which is formed on the end of an elongated child crotch strap 38 by folding the webbing from which the crotch strap 38 is formed back on it's self to form the loop 36. The crotch strap 38 includes a further loop 40 located on the other end of the elongated strap. Both the adult waist strap 12 and the child waist strap 14 pass through the loop 36 so as to connect the child waist strap 14 to the adult waist strap 12. The child waist strap 14 then repasses through the loop 40 so as to connect both ends of the crotch strap 38 to the child waist strap 14.

FIG. 9 shows a first construction as is illustrated in FIG. 1 for attaching the child waist strap 14 via loop 36 of the crotch strap 38 to the adult waist strap 12. As is evident from FIGS. 1 and 9, the loop 36 can be freely moved around the circumference of the adult waist strap 12 so as to allow for variable positioning of the child with respect to the adult. Thus, in FIG. 9 the loop 36 is sewn to itself using stitches 42 forming a loop of a sufficient size to allow for passing of both the adult waist strap 12 and the child waist strap 14 through it.

In a further construction shown in FIG. 8, the child waist strap 14 would be directly stitched using stitches 43 to a loop 44 which is similar in function to the loop 36. The loop 44 attaches to a crotch strap 46 to fix the position of the child waist strap 14 with respect to the loop 44. The adult waist strap 12 would be free to pass through the loop 44 allowing for sliding of the loop 44, with the child waist strap 14 attached thereto, around the circumference of the adult waist strap 12.

Referring back to FIG. 1, in use the adult would attach the adult waist strap 12 around their waist and secure it by fastening the buckle 16 to the buckle 20. Note that the end 22 of the waist strap 12 is positioned on the side and is directed towards the back of the adult allowing the adult to snug the waist strap 12 around the adult's waist without having the extra material of the waist strap 12, which is located between the end 22 and the buckle 20, in a position where it would encumber the child. Note also that it is preferable to position the buckles 16 and 20 at the side of the adult to get them out of the way of the child such that they do not form an uncomfortable obstruction between the child and the adult. This has an added benefit in that it removes the buckles out of range of the slightly older child who may be fascinated with them and attempt to unlock them.

The child is positioned in the device 10 by locating one of the child's legs to one side of the crotch strap 38 and the other of the child's leg on the other side of the crotch strap 38 and attaching the buckle 28 to the buckle 30. The child waist strap 14 is then adjusted to the child by pulling the free end 48 through the buckle 30. The buckles 20 and 30 are typical in construction and allow for adjustment of the position of the strap therein with respect to the buckle in a known manner for fixing the waist straps 12 and 14 to the adult and child in a snug but comfortable position. Because of the use of the crotch strap 38 in the device 10, the buckles 28 and 30 are located on the side of the child as were the adult buckles 16 and 20. The free end 48 of the child waist strap 14 is positioned back toward the adult allowing for ease of adjustment by the adult of the size of the child waist strap 14.

The embodiment of FIG. 1 essentially couples the child to the adult irrespective of whether the adult is sitting or standing. For use on airlines and the like, the standard airline seatbelt would be utilized to hold the adult in the airline seat with the two belts 12 and 14 then holding the infant to the adult. In case the adult had to immediately evacuate the seat, all the adult would need to do is release the standard airline seatbelt leaving the adult free to evacuate with the child still securely fastened to the adult. In case of a crisis situation, the adult would be securely fastened to the airline seat by the standard airline seatbelt, and the child would be fastened to the adult via the straps 12 and 14. If the passengers of the airline were suddenly thrust forward, the adult would be restrained by the standard airline seatbelt, and the child by the device 10.

In FIG. 2 a further embodiment of the invention is illustrated. The embodiment of this figure shows a device 50. In this embodiment, a standard airline seatbelt is utilized in conjunction with a further belt for the child. Thus, one side 52 of a standard airline seatbelt, which is equipped with a buckle 16, is utilized in conjunction with the other side 54 which is equipped with a buckle 20. However, instead of coupling the buckle 16 to the buckle 20, a further combination buckle 56 is utilized. The combination buckle 56 includes a left half having a slot 58 located therein which serves to receive and lock with the tab 24 of the buckle 16. On the other side of the combination buckle 56 is a tab 60 which is received by and locks with the buckle 20. Thus, the adult would utilize the buckle 56 in combination with the buckle 16 and 20 to securely fasten the adult to seatbelt sides 52 and 54 and, thus, to the chair that the adult would occupy.

A child waist strap 62 is appropriately attached to the buckle 56 utilizing a securing means, such as rivets 64 illustrated. The strap 62 would include a child buckle 28 and 30 allowing for attaching of the strap 62 to a child. A crotch strap 66 may or may not be connected to a waist strap 62 as is shown in FIG. 2. If the crotch strap 66 is utilized, it could be positioned, as is seen in FIG. 2, allowing the child to sit essentially perpendicular to the adult. This allows the child to sit comfortably on one leg or the other of the adult. Alternately the attachment of the crotch strap 66 to the waist strap 62 could be rotated, as for instance counterclockwise, such that one end of the crotch strap attached near the buckle 28 and the other end attached to the strap 62 near the rivets 64. This would essentially align the child almost in the same direction with the parent allowing the child to be held on the parent's lap with the child's legs draped along the parent's legs.

In FIG. 3 a further embodiment is shown. In this embodiment a device 68 is illustrated. The device 68 is similar to the device 10 with the exception that a continuous strap or webbing is utilized for both the adult waist strap and the child waist strap. The threading of this strap for both the adult waist strap and the child waist strap is shown in FIG. 4.

For the embodiment of FIG. 3, starting at end 70 of a strap 72, a first loop is made which forms an adult waist strap 74. An adjustable buckle 20 is located near the end 70 allowing for adjustment of the size of the adult waist strap 74. The strap 72 then passes through a buckle 16 and is attached back to itself via stitches 76. This fixes the position of the buckle 16 on the continuous length of the strap 72 to define the adult waist strap 74. The strap 72 then threads through a child buckle 28, wraps back on itself and is fixed to itself via stitches 78. The strap 72 is brought back toward the adult waist strap 74 and, alternatively, additional stitches 80 can be located just prior to the adult waist strap 74. The strap 72 then forms a further loop forming a child waist strap 82 which passes through an adjustable child buckle 30. The other end 84 of the strap 72 is free to be adjusted with respect to the child buckle 30 to allow for sizing of the child waist strap 82 with respect to the girth of the child.

A secondary strap 86 can be sewn via stitches 88 to the adult waist strap 74, and via stitches 90 to the child waist strap 82. The use of a secondary strap 86 symetrically positions the child waist strap 82 with respect to the adult waist strap 74. It, however, is not necessary. Alternatively, stitches 92 can be utilized to further connect the child waist strap 82 to the adult waist strap 74. Of course, the secondary strap 86 and the stitches 92 can both be utilized so as to firmly connect and shape the two waist straps 82 and 74.

A crotch strap 94, having a loop 96 at one end and a loop 98 at the other end, can be positioned on the child waist strap 82 as is shown in FIG. 3 to allow fore aft positioning of the child with respect to the adult. Alternatively, the buckle 16 on the adult waist strap 74 could be passed (as seen in FIG. 3) back from the right to the left through the loop 96 to position the loop 96 over the area occupied by the stitches 80. This positions the loop 96 solely on the child waist strap 82. In conjunction with moving of the loop 96, the loop 9B would also be slid a few degrees clockwise, as seen in FIG. 3, so as to allow essentially transverse positioning of the child's legs with respect to the adult. If the loop 96 is so sized during construction that it is slightly oversized with respect to the buckle 16, this allows for positioning of the crotch strap 94 either in the fore aft position of FIG. 3 or in the transverse position described above.

In FIG. 5 a further embodiment of a child's safety restraining device 100 is illustrated. It is similar in many respects to the device in FIG. 1 except that an independent loop 102 is utilized to connect the child waist strap 104 to the adult waist strap 106. The device 100 further utilizes a crotch strap 108 which can freely slide along the periphery of the child waist strap 104 allowing for both fore aft and transverse positioning of the child with respect to the adult. If the crotch strap is positioned as seen in FIG. 5, the child would be positioned transverse to the adult and the buckle (not separately numbered in the figure) on the child waist strap 104 would be positioned along the side of the child out of the child's way allowing ease of adjustment of the size of the strap 104 by the adult.

For the embodiment of FIG. 5, the adult waist strap 106 could either be an independent waist strap, as per the waist strap 12 of FIG. 1, or it could be an existing seatbelt fixedly attached to the seat of an airline or the like as was described in FIG. 2. If this were the case, the loop 102 would be slightly oversized allowing for ease of slipping of the loop 102 over the buckle of the existing airline seatbelt. In any event, the loop 102 is used to connect the belt 104 to the belt 106. Both of the belts of FIGS. 2 and 5 could be readily adaptable for use on a commercial airline with the belts being the possession of the airlines and checked out to users of the same when a child is to be held on the lap of the occupant of the seat of the airline.

Certain of the other embodiments, including the embodiments of FIGS. 1 and 3 as described, and of FIGS. 6 and 7 to be described below, have a further utility with respect to the belts of FIGS. 2 and 5 in that they are useable on other forms of public transportation, such as busses and trains which normally do not come equipped with seatbelts. Further for use on an airline, in an emergency situation, they allow the child to always remain tightly strapped to the adult independent of the adult's use of the existing airline's seatbelts as for instance, after a crash situation, when the adult has released the airline seatbelt but still wants to maintain a firm connection between the child and the adult during exiting of the airline.

In FIG. 6 a further embodiment of the invention is shown. In this embodiment, a device 110 is illustrated. The device 110 is similar to the device 10 of FIG. 1 with the exception that instead of a crotch strap, shoulder straps 112 and 114 are utilized for the child. For the device 110, the adult waist strap 116 would be as described for the waist strap 12 in FIG. 1. In the device 110, the child waist strap 118 is illustrated as being fixedly attached via stitches 120 to the adult waist strap 116. Alternatively, a loop, such as loop 102 of FIG. 5, could be utilized to attached the strap 118 to the strap 116.

Further, for the device 110, the child buckles 28 and 30 are positioned on the front of the waist strap 118 inbetween the two shoulder straps 112 and 114. Alternatively, the buckles 28 and 30 could be positioned on the side of the child waist strap 118, as will be illustrated with respect to an adult shoulder harness described in FIG. 7. In any event, irrespective of the positioning of the buckles on the child waist strap 118, the child would be secured by passing one arm underneath the shoulder strap 112 above the waist strap 118, and the other arm underneath the shoulder strap 114 above the waist strap 118. The buckles 28 and 30 would then be fastened. For use of the device 110, normally the adult waist strap 116 would be secured higher up on the adult, above the adult's waist to allow for positioning of the child on the adult's lap. The device 110 would find it's greatest utility for use with a slightly older active child who might be agile and smart enough to extract himself from the waist strap and crotch strap combination.

In the embodiment of the child safety restraining device shown in FIG. 7, a further device 122 is illustrated. In this device, adult shoulder straps 124 and 126 are attached to an adult waist strap 128. The attachment is made utilizing stitches commonly identified by the numeral 130. Note that the buckles 16 and 20 are located on one side of the adult waist strap 128. Normally in use of the device 122, the adult would pass the right arm underneath the strap 124 over the waist strap 128 and bring the strap 126 across the adult's head over the left shoulder. The waist strap 128 would then be secured by fastening the buckle 16 to the buckle 20, and the strap adjusted by pulling the end 132.

The child waist strap 134 is shown stitched via stitches 136 to the adult waist strap 128. Commonly stitched to both the waist strap 128 and the waist strap 134 is a crotch strap 138. The crotch strap 138 is further stitched via stitches 140 to a forward point on the child waist strap 134. This, thus, positions the buckles 28 and 30 of the child waist strap 134 to the side of the child.

Alternately, to the use of the fixed stitching 136 and 140 of FIG. 7, a crotch strap having loops, such as the crotch strap 138 with it's loops 36 and 40 of FIG. 1, could be utilized to attach the child waist strap 134 to the adult waist strap 128 of FIG. 7. Further, a free loop, such as free loop 102 of FIG. 5, could also be utilized.

Additionally, for the device 122, secondary buckles 142 and 144 can be fixed to the child waist strap 134 as is shown in FIG. 7. Additional secondary buckles 146 and 148 would be fixed to the adult shoulder straps 124 and 126. For entry to or exit from an airline or the like, the adult could totally support the child by utilizing auxiliary straps 150 and 152 in conjunction with the buckles 142, 144, 146, and 148. Thus, the strap 150 would be coupled at one of it's ends to the buckle 142, and the other of it's ends to the buckle 146 passing over the child's right shoulder with the child's right arm then positioned underneath the strap 150. Likewise, the strap 152 would be coupled to the buckles 144 and 148 with the child's left arm then passing underneath the strap 152. In this way, the child's weight would be supported via the straps 150 and 152 to fixedly and securely both attach and support the child within the device 122 on the adult. When so attached, the device 122 could be utilized as a carrier with the child securely attached to the adult. When the adult is seated in an airline and secures the airline seatbelt around the adult's waist, the straps 150 and 152 could then be detached to allow the child more freedom on the adult's lap.

Alternately, to the shoulder straps 124 and 126, and the auxiliary straps 150 and 152, a neck strap 154 could be utilized. The neck strap would include buckles 156 and 158 on it's ends which could connect to the buckles 142 and 144. The adult would first connect one of these buckles, as for instance buckle 156 to the buckle 142, past the length of the strap 154 up across the front of the adult around the adult's neck and then down in front of the adult again and connect the other buckle 158 to the buckle 144. This would provide an alternate way of securing the child to the adult supporting the child's weight within the child waist strap 134 and crotch strap 138.

Since the buckles 142, 144, 146, 148, and the buckles on the straps 150, 152, and 154, would not normally be utilized to restrain the child during a crisis situation, they can be formed of a lighter weight material and need not be safety buckles as per the other buckles utilized for attachment purposes.

It is evident that by attaching appropriate buckles, such as buckles 142 and 144, to the other devices of the other embodiments as for instance devices 10, 68 and 110, a neck strap 154 could be utilized with these other embodiments.

Generally, all of the straps or webbing utilized for the waist straps, crotch straps, connecting loops and shoulder straps of the various embodiments illustrated would conform to at least federal automobile safety standards both as to materials and construction. The appropriate stitches and safety buckles utilized to connect the straps together would also conform to the appropriate safety standards. Safety buckles would be utilized at least on the adult waist straps allowing for quick attachment or detachment of the various devices to the adult. Alternately, and preferably, they also would be utilized on the child waist strap allowing for quick attachment and detachment of the child from the adult for those situations wherein the adult may be pinned or otherwise fixed in a position during a catastrophic situation where it is advisable to quickly remove the child from the environment of the adult.

By utilizing safety belt materials for the straps and webbing of the various devices in conjunction with the use of safety buckles, the various child safety restraining devices of the invention would maintain a child safety secured to an adult in a crisis situation wherein the child was subjected to a substantial force which tended to separate the child from the adult such as a crash or other sudden stop or slowing down. Additional it would also safety secure the child to the adult in situations as for instance on any airline if the airliner hits an updraft or downdraft resulting in a sudden change of altitude. The use of the safety buckles not only provide for the required strength needed in crisis situations but also allow for quick disconnection of one or both of the child and the adult form the child safety restraining devices of the invention in the event this is necessary.

It is also evident that while crotch straps and shoulder harnesses have been shown in separate embodiments in the various embodiments of the invention, they could be used in combination such that the child is secured to a waist strap utilizing both a crotch strap and shoulder harness.

It is also preferred, and as is evident in the various embodiments described, with the exception of FIG. 2, to position the buckle on the adult waist strap to the side of the adult so as to locate the buckle in a position wherein it is not positioned between the child and the adult. This leads to both comfort and to removal of the adult's buckle as an enticement to a slightly older child. Since the adult must sit, the connecting means will always be oriented toward the front of the adult and on the back or the sides of the child.

I claim:

1. A child safety restraining device which comprises:
   a one piece continuous non-stretchable elongated webbing having ends;
   said elongated webbing having an adult first buckle means located proximal to one end thereof and a child first buckle means located proximal to the other end thereof, and further including an adult second buckle means located on said webbing between said ends of said webbing in a position spaced from said adult first buckle means so as to define an adult waist strap located between said adult first buckle means and said adult second buckle means, together said adult first and said adult second buckle means comprising a releasable safety buckle;
   said elongated webbing further including a child second buckle means located on said webbing in a position spaced from said child first buckle means between said child first buckle means and said adult second buckle means to define a child waist strap means located between said child first buckle means and said child second buckle means, together said child first and second buckle means comprising a further releasable safety buckle.

2. A child safety restraining device which comprises:
   an adult waist strap having an adult first buckle means located proximal to one end thereof and an adult second buckle means located on the other end thereof, together said adult first and second buckle means forming a releasable buckle;
   a child waist strap having a child first buckle means located proximal to one end thereof and a child second buckle means located on the other end thereof, together said child first and second buckle means forming a releasable safety buckle;
   a connecting means for fixedly and immobily connecting said child waist strap to said adult waist strap to maintain said child waist strap immobile with said adult waist strap;
   together said child waist strap and said adult waist strap comprising a one piece elongated continuous non-stretchable webbing having ends;
   said elongated webbing having said adult first buckle means located proximal to one end thereof and said child first buckle means located proximal to the other end thereof, and further including said adult second buckle means located on said webbing between said ends of said webbing in a position spaced from said adult first buckle means so as to form said adult waist strap as that portion of said elongated webbing which is located between said adult first buckle means and said adult second buckle means;
   said elongated webbing further including said child second buckle means located on said webbing in a position spaced from said child first buckle means between said child first buckle means and said adult second buckle means so as to form said child waist strap as that portion of said elongated webbing which is located between said child first buckle means and said child second buckle means.

3. In combination with a safety seatbelt, a child safety restraining device which comprises:
   said seatbelt sized and shaped for securing around the waist of a user thereof;
   said seatbelt having a releasable safety buckle for attaching said seatbelt to said user thereof;
   a child waist strap sized and shaped to encircle a child, said child waist strap being elongated and having ends;
   a releasable safety buckle for attaching said child waist strap to said child, said safety buckle including a first buckle portion attaching to one of said ends of said child waist strap and a second buckle portion attaching proximal to the other of said ends of said child waist strap, said portions of said safety buckle connecting together such that together said waist strap and said safety buckle form a loop capable of encircling the trunk portion of said child;
   combination buckle means for temporarily fixedly connecting said child waist strap to said safety seatbelt to temporarily unyieldingly connect said child waist strap to said safety seatbelt in a fixed and immobile position with respect to said seatbelt;
   said combination buckle means for operatively connection to an existing seatbelt buckle of the type having first and second sections which connect together, said combination buckle means including first and second attaching means for attaching to said seatbelt buckle, said first attaching means for connecting to one side of said seatbelt buckle sections and said second attaching means for connecting to the other of said seatbelt buckle sections;
   said combination buckle means further including a child waist strap connecting means for connecting to said child waist strap to secure said child waist strap to said combination buckle means.

* * * * *

UNITED STATES PATENT AND TRADEMARK OFFICE
CERTIFICATE OF CORRECTION

PATENT NO. : 4,759,311
DATED : JULY 26, 1988
INVENTOR(S) : MICHAEL A. BOYLE

It is certified that error appears in the above-identified patent and that said Letters Patent is hereby corrected as shown below:

In the Abstract, line 13, insert --with-- after the word "complies''.

In the Abstract, line 19, "restrainng" should be --restraining--.

Column 4, line 16, "it's" should be --its--.
Column 6, line 38, "9B" should be --98--.
Column 7, line 35, "inbetween" should be --in between--.
Column 9, line 9, "safety" should be --safely--.
Column 9, line 13, "Additional" should be --Additionally--.
Column 9, line 20, "form" should be --from--.
Column 10, lines 55 and 56 "connection" should be --connecting--.

Signed and Sealed this

Sixth Day of June, 1989

Attest:

DONALD J. QUIGG

Attesting Officer

Commissioner of Patents and Trademarks